UNITED STATES PATENT OFFICE.

WILLIAM W. MURRAY, OF BALTIMORE, MARYLAND, AND HARRY M. FERNBERGER, OF PHILADELPHIA, PENNSYLVANIA.

PROCESS OF TREATING DETINNED IRON AND RESIDUES.

943,986.  Specification of Letters Patent.  Patented Dec. 21, 1909.

No Drawing. Original application filed January 17, 1906, Serial No. 296,569. Divided and this application filed February 1, 1909. Serial No. 475,424.

*To all whom it may concern:*

Be it known that we, WILLIAM W. MURRAY, residing at Baltimore, in the State of Maryland, and HARRY M. FERNBERGER, residing at Philadelphia, in the county of Philadelphia and State of Pennsylvania, have invented certain new and useful Improvements in Processes of Treating Detinned Iron and Residues, of which the following is a specification.

Our present invention consists in a process of treating detinned iron and residues which remain after the tin plate scrap, alloys and other tin-bearing materials have been subjected to the action of chlorin, and converted into chlorid of tin. The residual mass, on account of its numerous interstices, contains a considerable percentage of the tin salt which is usually not recovered.

In our original application, filed Jan. 17, 1906, Serial No. 296,569, we have disclosed a special process of detinning scrap and the like and in such process we make use of carbon tetrachlorid as a solvent for the detinning agent chlorin gas and also for the resultant product stannic chlorid.

The present application is a divisional part of our original application filed January 17, 1906, before referred to.

After the detinning process has been performed the solvent containing the stannic chlorid is withdrawn from the scrap. Owing to the fact that the residual mass, on account of its numerous interstices retains a considerable percentage of the stannic chlorid, we have found it desirable, in practice to wash the detinned residues with fresh solvent, such as an anhydrous organic liquid of the methane series, for example, carbon tetrachlorid and the like, and thereby recover any stannic chlorid that may adhere to the detinned residues. After the detinned residue has been washed with fresh solvent, as frequently as is necessary to accomplish the desired result, the stannic chlorid may be separated from the wash liquid by water and the solvent recovered, an aqueous solution of stannic chlorid resulting from the treatment of the wash liquid with water. After the wash liquid has been removed from the residues the portion adhering to such residue may be removed by further washing the residue with water and by the application of heat.

In this application we make no claim to any specific detinning process as the residues treated by our present process may result from the use of any detinning process.

What we claim is:

1. The process of treating detinned iron and residues, which consists in washing the material with an anhydrous liquid capable of dissolving stannic chlorid.

2. The process of removing stannic chlorid from the surfaces of detinned iron and residues, which consists in washing the material with carbon tetrachlorid.

3. The process of treating detinned iron and residues, which consists in washing the material with an anhydrous liquid solvent of the methane series.

4. The process of treating detinned iron and residues, which consists in washing the material with a liquid capable of dissolving stannic chlorid and then heating the same.

WM. W. MURRAY.
HARRY M. FERNBERGER.

Witnesses to W. W. Murray's signature:
RODGERS O. KNIGHT,
OCTAVIUS O. KNIGHT.

Witnesses to H. M. Fernberger's signature:
EMMA C. ALEXANDER,
HENRY FERNBERGER.